US011463431B2

(12) United States Patent
Nigro et al.

(10) Patent No.: US 11,463,431 B2
(45) Date of Patent: Oct. 4, 2022

(54) SYSTEM AND METHOD FOR PUBLIC API AUTHENTICATION (71) Applicant: Disney Enterprises, Inc., Burbank, CA (US)

(72) Inventors: Carmen Nigro, Burbank, CA (US); Jonathan Steinmann, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 182 days.

(21) Appl. No.: 16/888,439

(22) Filed: May 29, 2020

(65) Prior Publication Data

US 2021/0377247 A1  Dec. 2, 2021

(51) Int. Cl.
*H04L 29/06* (2006.01)
*H04L 9/40* (2022.01)
(Continued)

(52) U.S. Cl.
CPC .......... *H04L 63/083* (2013.01); *H04L 9/3228* (2013.01); *H04L 9/3239* (2013.01); *H04L 67/133* (2022.05)

(58) Field of Classification Search
CPC ... H04L 63/083; H04L 9/3228; H04L 9/3239; H04L 67/40; H04L 9/0643; H04L 9/0861;
(Continued)

(56) References Cited

U.S. PATENT DOCUMENTS 10,230,710 B2   3/2019 Wang
10,299,005 B1*  5/2019 Killick ................. H04N 21/251
(Continued)

FOREIGN PATENT DOCUMENTS

CN   109474630 A   3/2019
CN   110401665 A   11/2019
(Continued)

OTHER PUBLICATIONS

"API Authentication, One time token VS Dynamic tokens"; Dec. 2019; Stack Exchange, Inc.; 4 pages https://softwareengineering.stackexchange.com/questions/205359/apiauthentication-one-time-token-vsdynamic-tokens.
(Continued)

*Primary Examiner* — Abu S Sholeman
(74) *Attorney, Agent, or Firm* — McCormick, Paulding & Huber PLLC (57) ABSTRACT A system and method for public API authentication by an API server includes receiving from a client/app a PK request for a Partial Key (PK), having a User ID, Session ID, rolling hash function (Fn2) version defining a client/app hash function (Fn2), and a received Temporary Key (TK); validating the received TK using Fn2 with the Session ID and either an Initial Key (IK) or a current PK; when the TK validation is complete, sending a PK calculated using a PK hash function (Fn1) with the User ID and a slot-generated rolling random number; receiving an API request for an API service having the User ID, Session ID, Fn2 version, and a received Authorization Key (AK); validating the received AK using Fn2 with the Session ID and the current PK; and when AK validation is complete, sending a successful response from the API service.

25 Claims, 7 Drawing Sheets

(51) Int. Cl.
*H04L 9/32* (2006.01)
*H04L 67/133* (2022.01)

(58) Field of Classification Search
CPC ... H04L 9/3236; H04L 63/12; H04L 63/0846; H04L 67/02; H04L 63/1458
See application file for complete search history.

(56) References Cited

U.S. PATENT DOCUMENTS

| | | | | |
|---|---|---|---|---|
| 2006/0291664 | A1* | 12/2006 | Suarez | H04L 9/3263 380/286 |
| 2008/0016333 | A1* | 1/2008 | Cao | H04L 9/3226 713/155 |
| 2008/0298579 | A1* | 12/2008 | Abu-Amara | H04L 63/061 380/30 |
| 2010/0046749 | A1* | 2/2010 | Hatano | H04L 9/088 380/44 |
| 2011/0107087 | A1* | 5/2011 | Lee | H04L 9/0869 713/155 |
| 2018/0212762 | A1* | 7/2018 | Peddada | H04L 9/3271 |
| 2021/0377247 | A1* | 12/2021 | Nigro | H04L 9/3228 |

FOREIGN PATENT DOCUMENTS

| | | |
|---|---|---|
| WO | 2017155703 A1 | 9/2017 |
| WO | 2019179534 A2 | 9/2019 |

OTHER PUBLICATIONS

Kempa, Matthias, "Keyed-Hash Message Authentication Code in REST APIs"; Jul. 2016; EclipseSource News; 5 pages https://eclipsesource.eom/blogs/2016/07/06/keyed-hash-messageauthentication-code-in-rest-apis/.

* cited by examiner

API Config. Service Logic (API Server)

Fig. 5

Fn2 Version Table

| Version # | Name | Hashing Function2 (Fn2) |
|---|---|---|
| 1 | Fn2-1 | Hash Function2 version 1 |
| 2 | Fn2-2 | Hash Function2 version 2 |
| 3 | Fn2-3 | Hash Function2 version 3 |
| 4 | Fn2-4 | Hash Function2 version 4 |
| ... | ... | ... |

500

SYSTEM AND METHOD FOR PUBLIC API AUTHENTICATION

BACKGROUND

APIs (Application Programming Interfaces) are fundamental to an organization's digital business. In order to transmit data between client and server within public digital products, such as websites, mobile applications and OTT (over-the-top) applications, and the like, the APIs that send the data to the client must remain accessible on the public internet. Any API on the public internet is vulnerable to security threats and requires preventive measures to reduce the risk profile.

For example, an unauthorized malicious client may write a script or create an App to make repeated API call or requests, which may overload the API server and produce "denial of service" API response messages, referred to a "Denial of Service" (DoS) attack. Also, an unauthorized malicious client may try to access unauthorized content or may send bad data to the server, which may slow down or corrupt the API server.

Given the high volume of API calls executed by an organization's digital products (e.g., billions of API calls per year), there is a need for an inexpensive and efficient way to authenticate traffic to ensure both security and data integrity in these high-volume scenarios. For example, for an API that is used to support a public user-facing software application, e.g., a mobile sports application, the API should only be accessed through the application. As a result, it is necessary to have a technique to validate that API calls and data are coming from appropriate sources.

Accordingly, it would be desirable to have a system and method to verify the identity of the client in order to keep unknown (and potentially malicious) clients from accessing the API while it is on the public internet.

DETAILED DESCRIPTION

As discussed in more detail below, in some embodiments, the system and method of the present disclosure provides "Public API" authentication using a series of algorithms (or hash functions), UUIDs (Universal Unique Identifiers), timestamps, and API calls between a Client/App and an API Server to generate secret (or unpredictable or random) authentication keys that are used to validate that API calls and data are coming from appropriate Client/App sources. To do this, logic (or software code) resides on both the Client/App and the API Server which translates (and validates) hashed secret authentication keys based on a series of randomly generated (secret) partial keys provided by a "configuration service" portion of the API Server, along with randomly generated unique identifiers or UUIDs (e.g., User ID and Session ID) generated by the Client/App, in-part from timestamps, to ensure obscurity even within a public domain, e.g., when a user does not self-authenticate via a login and password. In addition, the keys are updated based on time and activity level and associated solely with the unique identifiers or UUIDs. To add to the complexity and obscurity, the algorithms (or hash functions) used to generate the keys may be modified dynamically or change over time (e.g., by rolling through a predetermined list of different hash functions) to hash, or mathematically generate, the keys in random patterns known only to the API Server and to an authorized Client/App, both of which have the appropriate software code to execute each side of the authentication handshake. Such authentication handshake occurs for each API request/command received by the API Server from a given Client/App. If either side does not properly authenticate or validate, the API request from the Client/App is not executed by the API Server. Also, the authentication technique of the present disclosure ensures that a given Client/App is authorized to send API Requests to the publicly addressable API, even when the user has not logged into the App (i.e., user has not self-authenticated, or may be anonymous).

Also, the present disclosure may be used with a regular, unsecured connection (http) in addition to being used with a secured connection (https). Further, the present disclosure has less latency (is faster) and less expensive than prior art techniques because typically API requests get routed through an API gateway which causes the request to go (or "hop") through multiple different servers, and every hop adds latency. Thus, the present disclosure eliminates any hops through third party services, e.g., Amazon. Also, less hops reduces the cost for APIs that have a high volume of API calls, e.g., over 500 billion API calls/year.

In summary, each authentication key is unique to a given user Session, and each partial key is unique to a given User ID, the keys work for a temporary time period, and the keys are randomly generated using a collection of randomly generated UUIDs, then hashed using a custom algorithm (or hash function) that is not accessible to the public. In some embodiments, the hash function(s) may be randomized or dynamic to produce random patterns of key generation results, and may also use customized hashing functions, and can alter the hash version on each call. Also, one can plug in new algorithms or hashing functions at any time. This makes the present disclosure more difficult to hack by a cyber-attack or malware.

Figure 1:
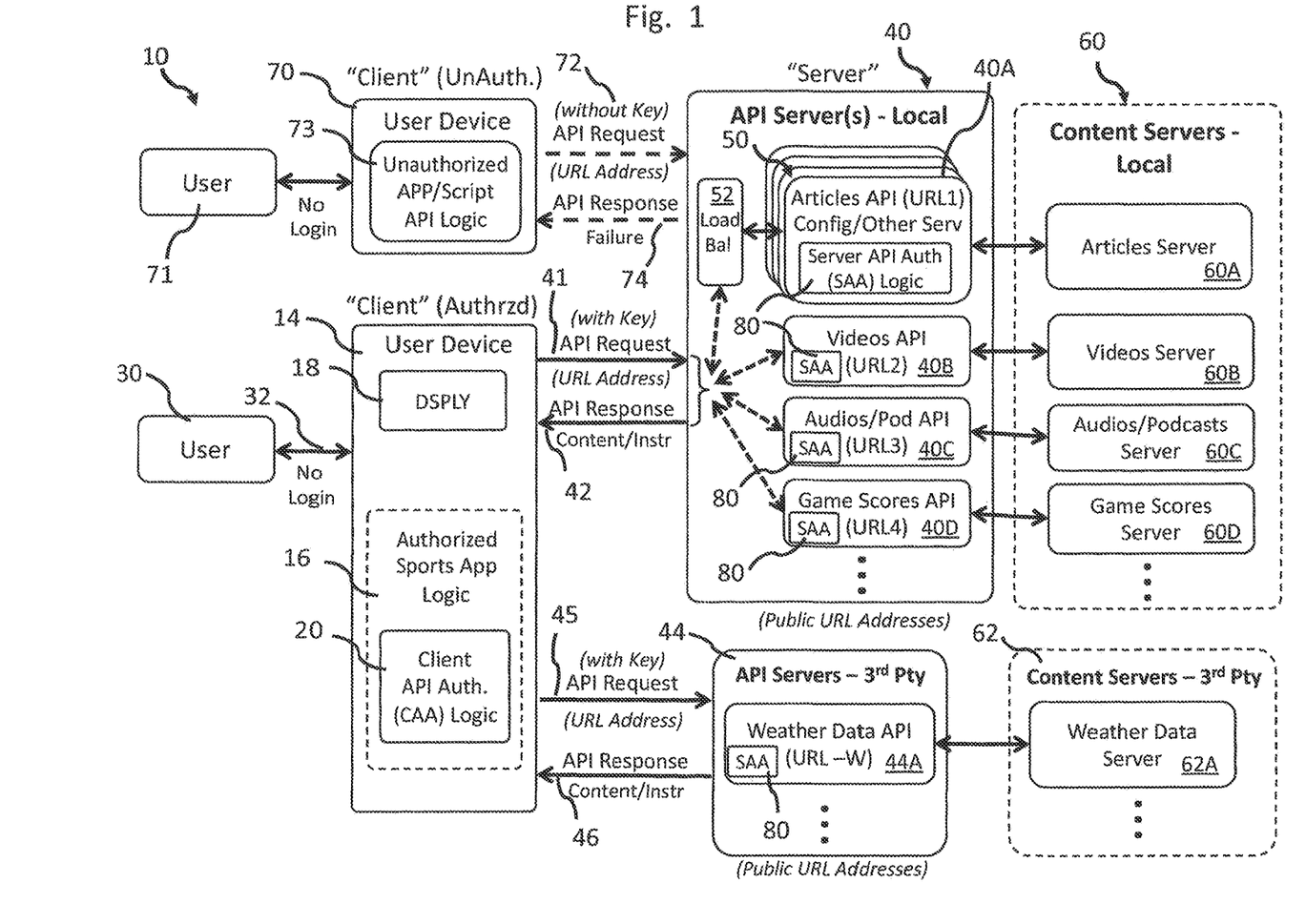
FIG. 1 is a top level block diagram of a system for public API authentication, in accordance with embodiments of the present disclosure.

FIG. 1 illustrates various components (or devices or logic) of a public API authentication system 10 of the present disclosure, which includes a user device 14, such as a smart phone or other computer-based device, having a software App 16 loaded thereon (e.g., a Sports App, or ESPN App, or other App), the App 16 having Client-Side API Authentication Logic (Client API Auth Logic) 20, and a display 18, and communicates with a User 30, as shown by a line 32. Also, the User 30 does not need to login to the App to self-authenticate (i.e., "no login" required), as many Apps provide free content or data to the general public who use the appropriate App to access the free content/data, e.g., sports-related content/data in this case. Thus, the User 30 remains anonymous ("no login"), while the Public API Authentication system and method of the present disclosure validates that the Client/App is legitimate (or has the authority) to send API Requests to the API Server.

The User Device 14 also communicates with one or more local API Servers 40, via the Client API Auth Logic 20, which sends API requests 41 to API (Application Programming Interface) software or logic, e.g., a REST (REpresentational State Transfer) API, located on the API Servers 40, corresponding to the App 16. Other API types may be used if desired. The user device 14 also receives API Responses 42 comprising content (or data) or instructions (or rules or results or response) from the APIs regarding how to interact with the APIs (API call rules), success/failure of the request (e.g., via known codes), and how to access desired content/data (e.g., web address). In particular, for a given App such as the sports App 16, there may be separate APIs (or API logics) for different types of information, such as Articles API 40A, Videos API 40B, Audios/Podcasts API 40C, Game Scores API 40D, and the like. The software code for the API's 40A-40D associated with the App 16 may be located on a common server or may be on separate servers. Also, each of the APIs may have their own public URL address, e.g., URL1 for the Articles API 40A, URL2 for the Videos API 40B, URL3 for the Audios/Podcasts API 40C, and URL4 for the Game (or Sports) Scores API 40D. The API Request is routed to the appropriate API based on the APIs public URL address, which is part of the API Request 41. Also, each API may provide multiple services (or respond to multiple requests), such as a Configuration Service, which provides information or rules for API calls or requests, and also provides Other Services associated with the API, such as API Request services, e.g., GET, PUT, POST, DELETE, for a REST API, discussed more hereinafter with FIG. 2. The Articles API 40A has a Server API Auth (SAA) Logic 80 which implements the Server-side of the public API Authentication of the present disclosure for the Articles API 40A, discussed more hereinafter. Also, the SAA logic 80 may also be located within each of the APIs having such API Authentication, e.g., Videos API 40B, Audios/Podcasts API 40C, Game Scores API 40D, and the like.

In some embodiments, the API Server 40 may be a "distributed" server arrangement 50 (or server bank or server farm or server pool), comprising a plurality of servers 50, which may be located in different physical locations, in the same building or different buildings. Such a distributed server 50 allows the APIs to run on a plurality of servers simultaneously, thereby allowing multiple API calls to be handled at the same time from different devices running the same app or different apps that share a common API. In that case, a known load balancer server or logic 52, may be used to handle/manage API calls and efficiently distributing incoming network traffic across the distributed servers 50, e.g., in a rotating sequential manner such as round robin or other pattern, thereby providing redundancy and traffic management, to route the API calls to an available server in the distributed server arrangement 50. Such distributed server arrangement 50 may be transparent to the operation App 16 and may not affect the API Request format or URL addresses for the API call.

Each of the APIs 40A-40D communicates with one or more local Content Servers 60, which provides the requested content (or data) to the APIs in response to the API Request 41, for use by the App 14 as requested by the User 30.

When the User 30 clicks on a link (or image, or icon, or the like) displayed on the User Device 14 by the App 16, e.g., to view an article or watch a video, or the like, the App 16 logic calls the appropriate API with the associated URL, using an API Request 41 having the appropriate data in the API request so the appropriate API logic 40A-40D can obtain the content and deliver it to the App 16. In certain cases, e.g., for an article request, the Articles API 40A may return the requested content or data in the API response 42 to the App16. In other cases, e.g., for a video request, the Video API 40B may return a link to the video in the API response 42 to the App16, which the App 16 can be connected or streamed or downloaded to the device directly from the link provided.

The API Servers 40 may be called "local" servers as they may be controlled by the maker of the App., even if they are located remote from the content creator, and thus can set the rules of engagement (or communication protocol) with a client, and can design the App to work efficiently with the local APIs on the local API Servers.

The user device 14 also communicates with one or more 3rd party API Servers 44, via the Client API Auth Logic 20, to send API requests and receive content (or data) or instructions (or rules or results or response) regarding how to interact with the 3rd party APIs, success/failure of the interaction, and how to access desired content/data. In that case, such 3rd party APIs are not controlled by the maker of the App and provide 3rd party data or information to the App 16. Each of the 3rd party APIs 44 communicates with one or more 3rd party Content Servers 62, which provides the requested 3rd party content (or data) to the 3rd party APIs in response to the 3rd party API Request 45, for use by the App 16 as requested by the User 30.

The 3rd party APIs may operate similar to the local APIs 40A-40D, described above, and receive a $3^{rd}$ party API Request to the particular API, which provides a $3^{rd}$ party API Response, and each 3rd party API also has its own public URL address. The URL for the $3^{rd}$ party API is also a public URL address, e.g., shown as URL-W for a $3^{rd}$ party weather data API. Also, each of the $3^{rd}$ party APIs 44 communicates with one or more $3^{rd}$ party Content Servers 62, which provides the requested $3^{rd}$ party content (or data) to the $3^{rd}$ party APIs in response to the $3^{rd}$ party API Request 45, for use by the App 16 as requested by the User 30.

For example, in the Sports App 16, there may be an icon for local weather. When the User 30 clicks on the local weather icon, the App 16 will make an API Request 45 to obtain the desired local weather, which would get executed by the $3^{rd}$ party API 44A and request the data from the $3^{rd}$ party content server 44A, and the API will return an API Response 46 to the App 16 with the local weather information requested by the User 30.

As discussed herein, the system and method of the present disclosure has a Client/App authentication technique which ensures that a given Client/App is authorized to send API Requests to the publicly addressable API 40, even when the user has not logged into the App (i.e., has not self-authenticated). In particular, the present disclosure requires a Client/App to use an appropriate authorization key (or signature) when sending an API Request 41, which allows the API Server to verify the Client/App is an "authorized" Client/App. If the Client/App successfully passes the authorization verification (or validation) by using the correct key(s), the API will perform the desired API Request and return the desired content, data, or instructions per the API Request. (discussed more hereinafter).

As discussed herein above, because the URL(s) for the API Servers 40,44 are public URL addresses, any online device running an app or script code can send an API Request to the API Servers 40,44, which may cause problems as described herein above, e.g., Denial of Service (DoS) attacks, unauthorized content access, or other issues. However, if a User Device 70, used by a User 71, has an App or Script API logic 73 that is not authorized to communicate with the API Server 40, deemed an "unauthorized" Client/App, an API Request 72 will not have the appropriate key (or signature) and the API Servers 40 will provide an API Response 74 having an unsuccessful or fail message.

Figure 2:
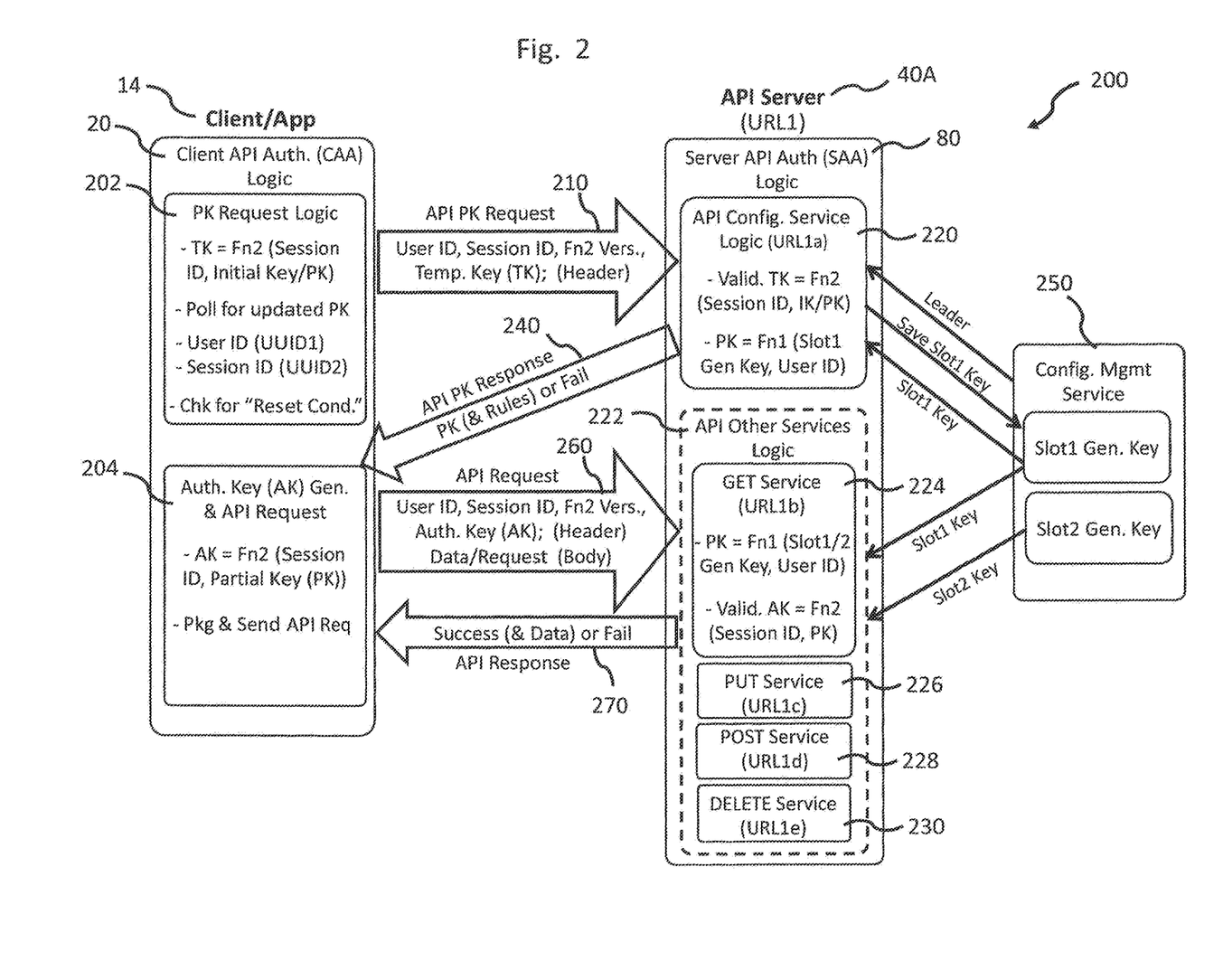
FIG. 2 is a top level data flow diagram showing a handshake between a Client/App and an API Server for providing public API authentication, in accordance with embodiments of the present disclosure.

Referring to FIG. 2, an overview data flow block diagram 200 shows the authentication process at a high level. In particular, the Client/App 16 has the Client App Authorization (CAA) Logic 20, which executes the appropriate logic to perform the necessary authentication with the API Servers, e.g., the API Server 40A. The Client API Auth (CAA) Logic 20 can be viewed has having two primary portions, a PK Request Logic portion 202, and an Authentication Key (AK) generation and API Request portion 204.

The Temporary Key (TK) generation portion creates (or generates) a Temporary Key (TK) to send to the API Server 40A as indicated by the arrow 210. The TK is created by using a one-way hashing function or algorithm called hash Function2 (or Fn2) which combines two input values and provides an output value that is unique for unique input values and is repeatable when the same input values are used (discussed more hereinafter). In particular, the TK is generated by hashing a Session ID and either an Initial Partial Key or a current Partial Key (each described hereinafter) together using the hash Function2 (Fn2).

The Temporary Key (TK) is provided to the Configuration Service logic 220 of the API Server 40A along with a UserID, Session ID, and the version of the hash Fn2 (Fn2 Vers) used to create the Temporary Key (TK), all located in the header (or "http" header) of an API PK Request. It is placed in the header so the Configuration Service logic 220 (discussed hereinafter) can quickly identify the type of request without having to read the body of the request. The API PK Request 210 may be formatted differently if desired.

The User ID (or Visitor ID), also referred to herein as UUID1 (or Universally Unique Identifier 1) is created by the Client API Auth. Logic 20 using a known UUID generator, e.g., using a timestamp and the MAC/PC address of the computer or device generating it, or using random numbers from a secure random number generator, such as the UUID generators described at www.uuidgenerator.net. Other UUID generators may be used if desired provided they provide a randomly generated unique identifier UUID that has an acceptably low chance of collision for a given application. There may be different implementations within the different device platforms or SDKs (software development kits) to provide such UUIDs.

The User ID (UUID1) value may persist across different sessions of the App 16 and may be used to identify the User Device 14 or the Client/App 16 on the Device 14. Also, a new User ID (UUID1) value may be generated when a Reset Condition occurs, as discussed herein.

The Session ID, also referred to herein as UUID2 (or Universally Unique Identifier 2) is created by the Client API Auth. Logic 20 using one of the UUID generators described herein above for the User ID (UUID1). The Session ID (UUID2) value may be generated each time the App 16 is opened and is, thus, temporary and unique to the specific session of the App 16. The User ID and Session ID may be any two random numbers and may not need to be tied to (or associated with) a user or a session, respectively. The version of the hash function2 (Fn2) may be determined based on any desired pattern of Fn2 version selection, provided the App 16 always knows what version of the hash Fn2 is being used.

Figure 5:
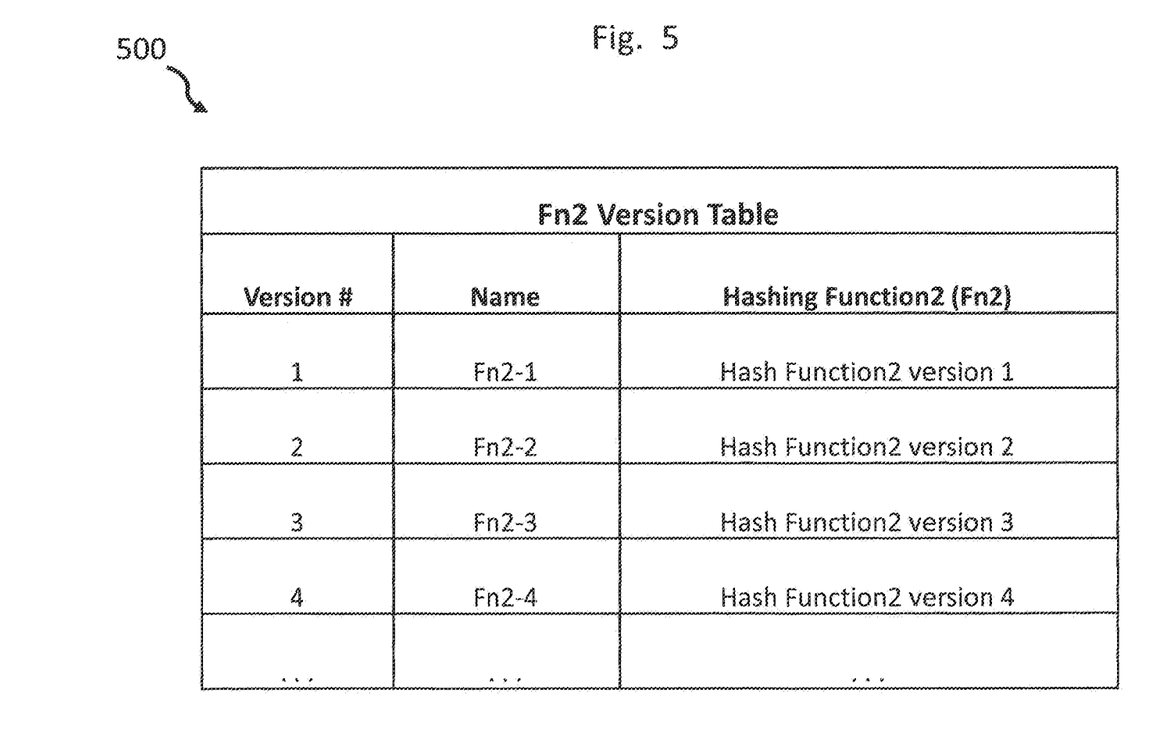
FIG. 5 is a table showing various versions of a hashing function Fn2, selected by the Client/App-side public API authentication, in accordance with embodiments of the present disclosure.

For example, referring to FIG. 5, an Fn2 Version Table 500 is shown, where there may be 4 (four) different hash Function2 (Fn2) versions, which are rotated sequentially through on an assigned list of Fn2 version names, e.g., Fn2-1, Fn2-2, Fn2-3, Fn2-4, each associated with a different hash function version, then back to Fn2-1, or the Fn2 version number may be selected randomly from the list by a random number generator, or by any other function selection technique. In some embodiments, the system/logic assigns various hashing algorithms to associated numbers, shown as a Version number column in FIG. 5, and saves the numbers in a database on a server or on the User Device 14. Then the logic randomly selects one of the Fn2 version numbers, which selects and uses the identified hashing function2 version or technique. Thus, the Fn2 version number defines, or identifies, or is indicative of, or is associated with, the hash function Fn2 to be used by the Client/App to generate the Temporary Key (TK) or the Authentication Key (AK), as discussed herein, and by the API Server to perform verification or validation of a received TK or AK.

Any type of one-way hash function(s) that produce the same output result given the same input, may be used with the present disclosure for Fn1 or Fn2, such as the following known hash functions (e.g., SHA1, MD5, Murmur3, CityHash):

1) SHA-1 (Secure Hash Algorithm-1): github.com/cloudcoderdotorg/Cloud Coder/blob/master/CloudCoder-ModelClasses/src/org/cloudcoder/app/shared/model/SHA1.java (or SHA-256, SHA-2, or SHA-3 or the like; cryptographic hash function);
2) MD5 (Message-Digest Algorithm): github.com/cbare/MD5/blob/master/src/main/cbare/md5/MD5.java (or MD6 or the like; cryptographic hash function);
3) Murmur3: github.com/apache/hive/blob/master/storage-api/src/java/org/apache/hive/common/util/Murmur3.java (or MurmerHash3 or the like; non-cryptographic hash function); and
4) CityHash: gist.github.com/daimatz/0413c2f55462cf0d434a0ad62fdc920a (or CityHash64 or the like; provides hash functions for strings; non-cryptographic hash function).

Also, custom hash functions based on implementations of the above known hash functions may also be used if desired. Also, the hash functions Fn1,Fn2 used herein may be "cryptographic" or "non-cryptographic" hash functions; however, the security of the handshake may be even stronger when using a "cryptographic" hash function (e.g., SHA-1, MD5, etc.).

Referring again to FIG. 2, the first time the TK is generated, an "Initial Key" (or Initial Partial Key) is used (as no current PK has been generated yet by the API Server). The Initial Key (IK) is a pre-determined fixed default value that may be stored in the device or obtained from a remote server or hard-coded into the App software or firmware. Once a PK has been generated by the API Server 40A, the current value of PK is used to poll the API Server for an updated PK value, where such polling may occur at a given periodic PK polling update rate, e.g., 10 min, or any time less than the rolling PK change rate, e.g., 30 min (discussed hereinafter).

The API Server 40A receives the API Request 210 having the User ID, Session ID, Fn2 Version, and Temp. Key (TK) at the Configuration Service URL (URL1a) of the API. In particular, the API includes the Configuration Service logic 220, and Other Services logics 222 specific to the API type, e.g., REST API, which may include a GET Service logic 224, PUT Service logic 226, POST Service logic 228, and DELETE Service logic 230. Other service logics and API types may be used if desired. Also, each of the API service logics on the API Server 40A may each have their own unique public URL address, as is known, e.g., the Configuration Service logic 220 having URL1a, the GET Service logic 224 having URL1b, the PUT Service logic 226 having URL1c, the POST Service logic 228 having URL1d, and the DELETE Service logic 230 having URL1e.

The configuration Service 220 validates the TK is correct by recreating (or independently calculating) the TK (e.g., a "confirming" TK) using the Fn2 version and the Session ID in the request 210 and using either the Initial Key (first time through or when a "Reset" time occurs) or the current Partial Key (PK) (e.g., when the Client is polling for the latest PK), and validating that the "confirming" TK and the received TK are the same. When using the Initial Key, the API Server obtains the Initial Key locally from the API Server or another predetermined memory location for use by the API Server, which is different location from where the Client obtained the Initial Key. As discussed herein, the Initial Key is a static fixed value which is used by both the Client API Auth Logic 202 and the Server API Auth Logic 80 but stored in separate locations.

If the API Config. Service Logic 220 validates the Temporary Key (TK), the Config. Service Logic 220 generates a Partial Key (PK) and sends it to the Client/App 20 together with the initial API configuration information as an API PK Response as indicated by an arrow 240. In particular, the PK is created by using a one-way hashing function or algorithm called hash Function1 (or Fn1 or PK Fn1), similar to the type of hashing function used by Fn2 described herein above, but Fn1 is fixed (not varying), which combines two input values and provides an output value that is unique for unique input values and is repeatable when the same input values are used (discussed more hereinafter). In particular, the PK is generated by hashing a User ID and a Slot1 Generated Rolling Random Key (which changes every 30 minutes) together using the hash Function1 (Fn1). The hash function Fn1 is a secret fixed hash function that is known only to the API Server (and not known by the Client/App). The PK-generating hash function Fn1 (or PK Fn1) may be stored (or saved) on the API Server, or on another server accessible by the API Server but not accessible by the Client/App. The Slot1 Generated Rolling Random Key is created using a known random number generator tool or may use a UUID tool, e.g., a basic Java UUID class, and is set to periodically update, e.g., every 30 minutes (Slot1 Gen. Key rolling rate). Thus, the PK value also changes every 30 min (PK rolling or cycle or update rate). Other Slot1 Gen Key rolling rates and corresponding PK rolling rates may be used if desired.

The hash function label Fn2 is used herein for the varying hash function Fn2 used by the Client/App 16 to generate the temporary key (TK) and an authentication key (AK) and the hash function label Fn1 is used herein for the fixed hash function Fn1 used by the API Server generate the partial key (PK). In operation, the API Server uses Fn1 to generate the Partial Key (PK), which is sent to the Client/App and is usable (or valid) for a predetermined period of time (or the slot key generation time or PK validity time or PK cycle time), e.g., 30 min. Then, the Client/App uses Fn2 and the current Partial Key (PK) to generate the Authentication Key (AK), which is validated by the API Server. Thus, Fn1 may be referred to herein as the "first" or "API Server" or "PK" hash function Fn1, and Fn2 may be referred to herein as the "second" or "Client/App" hash function Fn2. Also, on a periodic basis that is faster than PK update cycle time (e.g., every 10 min), the Client/App also uses Fn2 to generate the Temporary Key (TK) to send the API PK Request to the API server (which may be referred to herein as "polling").

In some embodiments, a Configuration Management Service (CMS) 250, e.g., Apache ZooKeeper open source configuration service developed under the Apache Software Foundation, is used to provide a centralize service for maintaining configuration information, see zookeeper.apache.org for more information. Any type of CMS may be used if desired provided it provides the desired function and performance. The CMS 250 may be used when the API Server 40A is a distributed server (discussed herein above with FIG. 1). In that case, the CMS would assign one of the API Servers as a "Leader", which would calculate the Slot1 Gen Key and provide it to the CMS for storage (Save Slot1 Gen Key) and for use by all the distributed servers 50 that make-up the API Server 40A. The CMS 250 will also save the prior version of the Slot1 Gen Key, called "Slot2 Gen Key", as the last two Slot Gen Keys are always valid to allow for asynchronous or "stateless" operation of both the Client/App 16 and the API Server 40A.

The Partial Key (PK) is provided to the Client/App 20 and used by the Authentication Key (AK) portion 204 of the Client API Auth. Logic 20. The Partial Key (PK) is used by the Client/App 20 as a "signature" to generate an Authentication Key to be used by the Client/App 20 with all API Requests until the PK changes (as discussed hereinafter).

In particular, the Authorization Key (AK) generation portion 204 of the Client API Auth Logic 20 creates the Authentication Key (AK) to send to the API Server 40A in an API Request, as indicated by the arrow 260. The AK is created by using the one-way hashing function or algorithm Function2 (or Fn2), described herein above with TK Generation portion 202. In particular, the AK is generated by hashing the Session ID and the current Partial Key together using the hashing Function2 (Fn2).

The Authorization Key (AK) is provided to one of the "Other Services" logics 222 of the API Server 40A, based on the specific API Request, e.g., the GET Service 224 for a GET API Request, along with the UserID, the Session ID, and the version of the hash Fn2 (Fn2 Version) used to create the Authentication Key (AK), all located in the header (or "http" header) of an API Request 260. It is placed in the header so the Other Services logic, e.g., Get Service logic 224 for a GET API Request, can quickly identify the type of request without having to read the body of the request. The API Request may be formatted differently if desired.

The GET Service logic 224 re-calculates (or re-creates or re-generates) the Partial Key (PK) using the hash Function1 (or Fn1), and hashing together the User ID and the Slot1 Generated Rolling Random Key (which changes every 30 minutes). The PK is re-calculated (instead of retrieving it from memory) to avoid having to store the PK for each of the Clients/Apps and then having to retrieve them, to save memory space and processing/response time. Thus, when the PK is calculated by the Config. Service 220, it is sent to the Client/App but is Not saved in memory at the API Server.

In some embodiments, if response time and memory space are not a concern, the current PK associated with each Client/App may be stored upon creation by the API Config. Service and retrieved by the API Other Services when needed to validate the received AK. In that case, two values of PK (current PK and prior PK) would need to be stored, e.g., in the CMS or other storage location, similar to the Slot1 and Slot2 storage discussed herein.

The Slot1 Generated Rolling Random Key is retrieved (or obtained) from the CMS 250 to perform the hash Fn1 calculation. Because the Slot1 Gen Key value changes every 30 min, a second earlier version of Slot1 (called Slot2) is available if the AKs don't match the authentication, because the Slot value changed between creating the PK by the Config. Service and processing the API Request.

Once the PK is re-created (or re-calculated), the received AK from the Client/App is validated by independently calculating AK (e.g., a "confirming" AK) using hash Function2 (or Fn2) and hashing together the Session ID (from the header in the API Request 260) and the PK just calculated, and validating that the "confirming" AK and the received AK are the same. If they don't match, the GET Service logic 224 re-creates the Partial Key (PK) again (e.g., Slot2 PK), using the hash Function1 (or Fn1), and hashes together the User ID and the Slot2 Generated Rolling Random Key (Slot2), which may have changed between creating the PK by the Config. Service and processing the API Request. The AK validation described above is repeated using the re-created PK using Slot2 (Slot2 PK), to independently calculate a Slot2-based "confirming" AK and then validates whether the Slot2-based "confirming" AK and the received AK are the same (using Slot2).

If the GET Service logic 224 validates the Authentication Key (AK), using Slot1 or Slot2 Generated Rolling Random Key, the Config. Service 220 generates an API Response message which includes a "Success" message (e.g., Success Code 200 in header) and sends it to the Client/App 20 together with any associated data, as indicated by an arrow 270. The other API services, e.g., PUT Service 226, POST Service 228, DELETE Service 230, operate in a similar fashion to the GET Service 224.

Figure 3A:
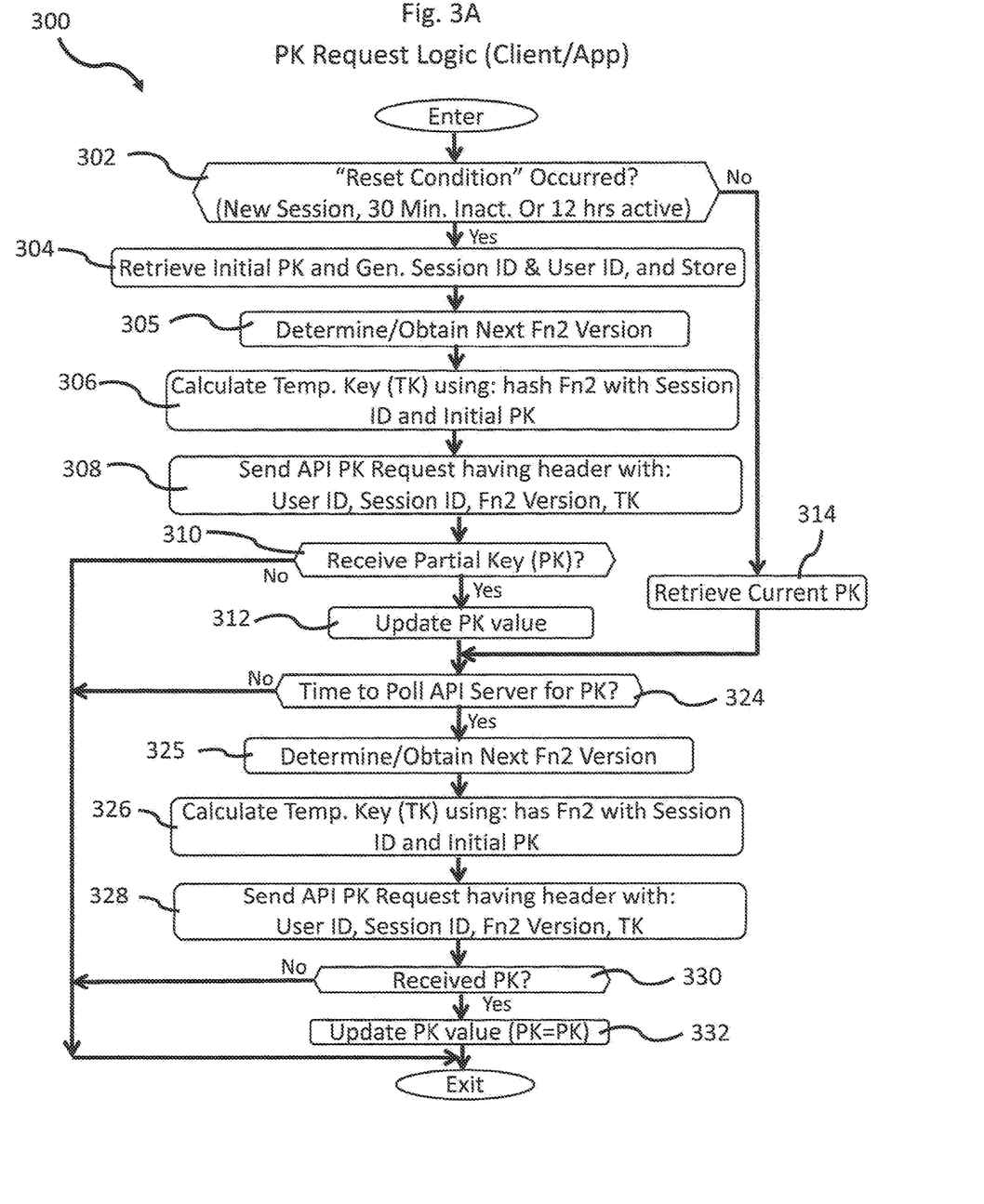
FIG. 3A is a flow diagram showing a Partial Key (PK) request portion of a Client/App-side public API authentication, in accordance with embodiments of the present disclosure.

Referring to FIG. 3A, a flow diagram 300 illustrates one embodiment of a process or logic for implementing the PK Request Logic portion 202 (FIG. 2) of the Client API Auth. (CAA) Logic 20 (FIGS. 1 and 2). The process 300 begins at block 302, which determines whether a "Reset Condition" has occurred, e.g., a new session of the App 16 has started (e.g., the App was closed and re-opened), or 30 minutes of inactivity have occurred on the App, or 12 hours of continuous activity have occurred on the App. If Yes, the logic at block 304 retrieves the fixed, static Initial Key (IK) from memory and generates the random unique Session ID (UUID1) and the random unique User ID (UUID2), and saves them both in memory on the User Device 14 (e.g., in device random access memory (RAM)), as discussed herein. Other or additional conditions may be used for the Reset Condition if desired, e.g., different times for inactivity or continuous activity. The Reset Condition causes a new unique random Session ID and User ID to be generated, which is used (together with other dynamic components discussed herein) to create the Partial Keys (PKs) and the Authorization Keys (AKs), as discussed herein. Next, block 305 determines the next version of the hash function Fn2 (Fn2 Version). The Fn2 Version may be determined based on random selection from a predetermined list of Fn2 functions or by other techniques, as discussed herein above with FIG. 2 and FIG. 5. Next, block 306 calculates a temporary authorization key (or Temporary Key or TK) using the Fn2 Version from block 305 and the Initial Key (IK). Next, block 308 sends an API Request for the Partial Key (PK), or API PK Request, having the User ID, Session ID, Fn2 Version, and TK. Next, block 310 determines if the initial Partial Key (PK), or first PK after a Reset Condition, has been received from the API Server. If Yes, block 312 saves the initial PK value received from the API Server. If the result of block 310 is No, a PK value was not received in response to the API request (e.g., the temporary key (TK) was not confirmed by the API Server, or other failure reasons), and the logic exits.

If the result of block 302 is No, a Reset Condition has not occurred and block 314 retrieves the current PK value and proceeds to block 324. After block 312 or block 314, block 324 determines if it is time to poll the API Server for the next PK, i.e., determine if it has been 10 min since last PK poll. Other PK poll times may be used if desired, as long as it is shorter than the time period for generating new PKs, e.g., 30 min. Other PK generation time periods or frequencies for generating new PKs may be used if desired, which would be implemented by the Configuration Service Logic portion 220 of the Server API Authorization logic described herein with FIG. 4A. If the result of block 324 is No, it is not time to poll the API Server for the PK value and the logic exits. If the result of block 324 is Yes, it is time to poll the API Server to get the value of PK (current value or next value, depending on timing), and block 325 determines the next version of the hash function Fn2 (Fn2 Version), similar to block 305. The Fn2 Version may be determined based on random selection from a predetermined list of Fn2 functions or by other techniques, as discussed herein above.

Next, block 326 calculates a temporary authorization key (or Temporary Key or TK) using the Fn2 Version from block 325 and the current Partial Key (PK). Next, block 328 sends an API Request for the Partial Key (PK), or API PK Request, having the User ID, Session ID, Fn2 Version, and TK (all in the http header of the request). Next, block 330 determines if the Partial Key (PK), has been received from the API Server. If Yes, block 332 saves the current PK value received from the API Server) and the logic exits. If the result of block 330 is No, a PK value was not received in response to the API request (e.g., the temporary key was not confirmed by the API Server, or other failure reasons), and the logic exits.

Figure 3B:
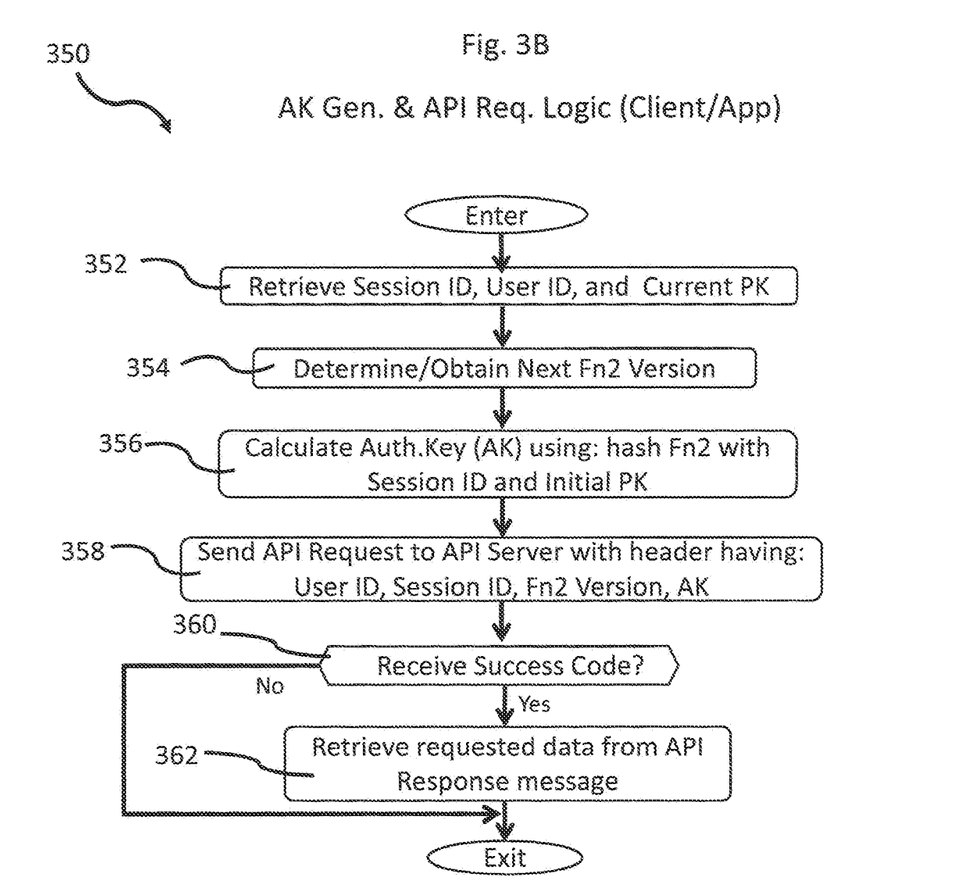
FIG. 3B is a flow diagram showing an Authorization Key (AK) generation and API request portion of a Client/App-side public API authentication, in accordance with embodiments of the present disclosure.

Referring to FIG. 3B, a flow diagram 350 illustrates one embodiment of a process or logic for implementing the Authorization Key (AK) Generation and API Request Logic 204 (FIG. 2) portion of the Client API Authentication (CAA) Logic 20 (FIGS. 1 and 2). The process 350 begins at a block 352, which obtains the Session ID and current Partial Key (PK) value. Next, block 354 determines the next version of the hash function Fn2 (Fn2 Version). The Fn2 Version may be determined based on random selection from a predetermined list of Fn2 functions or by other techniques, as discussed herein above with FIG. 2 and FIG. 5 and FIG. 3A. Next, block 356 calculates the Authentication Key (AK) using the hash function Fn2 Version from block 354 with the Session ID and current PK value. Next, block 358 sends an API Request to the API Server, having the User ID, Session ID, Fn2 Version, and AK, all in the header, and any corresponding data of the request (e.g., URL for GET Service request) in the body of the API Request.

Next, block 320 determines if a "success code" was received in the API Response 240 (FIG. 2) and, e.g., Success Code 200. If No, a fail or unsuccessful code was received and the logic exits. If Yes, a "success code" was received, and block 322 retrieves the requested data from the API Response message for use by the App 16 to provide to the User 30, e.g., the article requested, or video launched, or audio/podcast launched, or game scores provided.

Figure 4A:
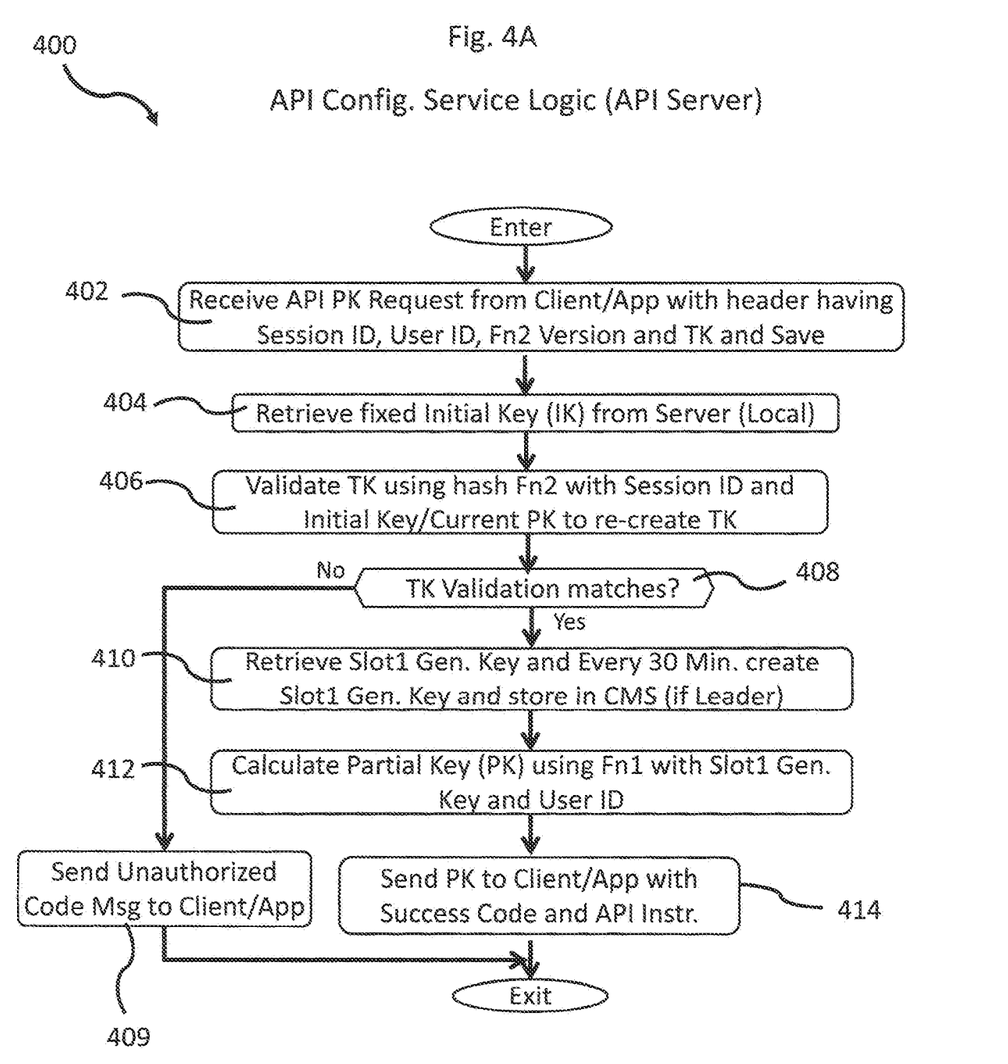
FIG. 4A is a flow diagram showing a API "Configuration Service" portion of an API Server-side public API authentication, in accordance with embodiments of the present disclosure.

Referring to FIG. 4A, a flow diagram 400 illustrates one embodiment of a process or logic for implementing the API Configuration Service Logic 220 (FIG. 2) portion of the Server API Authentication (CAA) Logic 80 (FIGS. 1 and 2). The process begins at block 402 when the API Server receives a request for a Partial Key (PK) from the Client/App 16 (API PK Request 210, FIG. 2) having the User ID, Session ID, Fn2 Version, and TK all in the header of the request. Next, block 404 retrieves the Initial Key (IK) from memory (e.g., a server) which is the same value as the fixed Initial Key also obtained by the Client/App, but the API Config. Serv. Logic 220 obtains it independently and from a different location or server than the Client/App. Next, block 406 attempts to validate the received Temporary Key (TK) using the version of the hash Function2 (Fn2) provided in the API PK Request to re-create the Temporary Key (e.g., a "confirming" TK) independent from the Client/App source of the TK, and compare it to the received Temporary Key (TK) from the Client/App in the API PK Request to verify they match. The hashing function Fn2 is performed with the Session ID and either the current Partial Key (PK), if the Client/App is polling for the latest PK, or the Initial Key (IK), if the Client/App is under a "Reset Condition" discussed herein before with the Client Authentication API (CAA) Logic 20. Block 406 may first try to validate using the current Partial Key (PK), as PK polling occurs more frequently than a reset condition, and if not successful, may then try to validate using the Initial Key (IK), which is used by the Client/App to generate the TK during a Reset Condition. The Reset Condition is determined by the Client/App 16, as described herein, e.g., based on Client/App time or activity or session change. The TK validation attempts may be done in the opposite order, if desired (i.e., attempt to validate using the Initial Key first, then attempt the current Partial Key) or may calculate both conditions each time and then check if either matches the received TK.

Next, block 408 determines whether the received Temporary Key (TK) was valid, i.e., whether the confirming TK matches the received TK, based on the results of the TK validation attempt in block 406. If No, block 432 sends an "unauthorized" code or "failure" message (e.g., Unauthorized Code 401) to the Client/App that sent the API Request and the logic exits. If the result of block 408 is Yes, the received Temporary Key (TK) was valid, and the logic 400 proceeds to block 410, which either obtains the Slot1 Generated Key (discussed herein with FIG. 2) from the CMS 250 (FIG. 2), or generates the Slot1 Generated Random Key, if the Slot1 Generated Random Key is 30 minutes old and the API Server is the designated Leader (in a distributed API Server environment 50 (FIG. 1)) by the CMS, as discussed herein above with FIG. 2.

Next, block 412 calculates (or generates) the Partial Key (PK) using the hash Function Fn1 with the Slot1 Generated Random Key and the User ID received from the Client/App in the header of the API PK Request. Then, block 414 sends the Partial Key (PK) to the Client/App with a success code and instructions for how to use the API (discussed herein before).

Figure 4B:
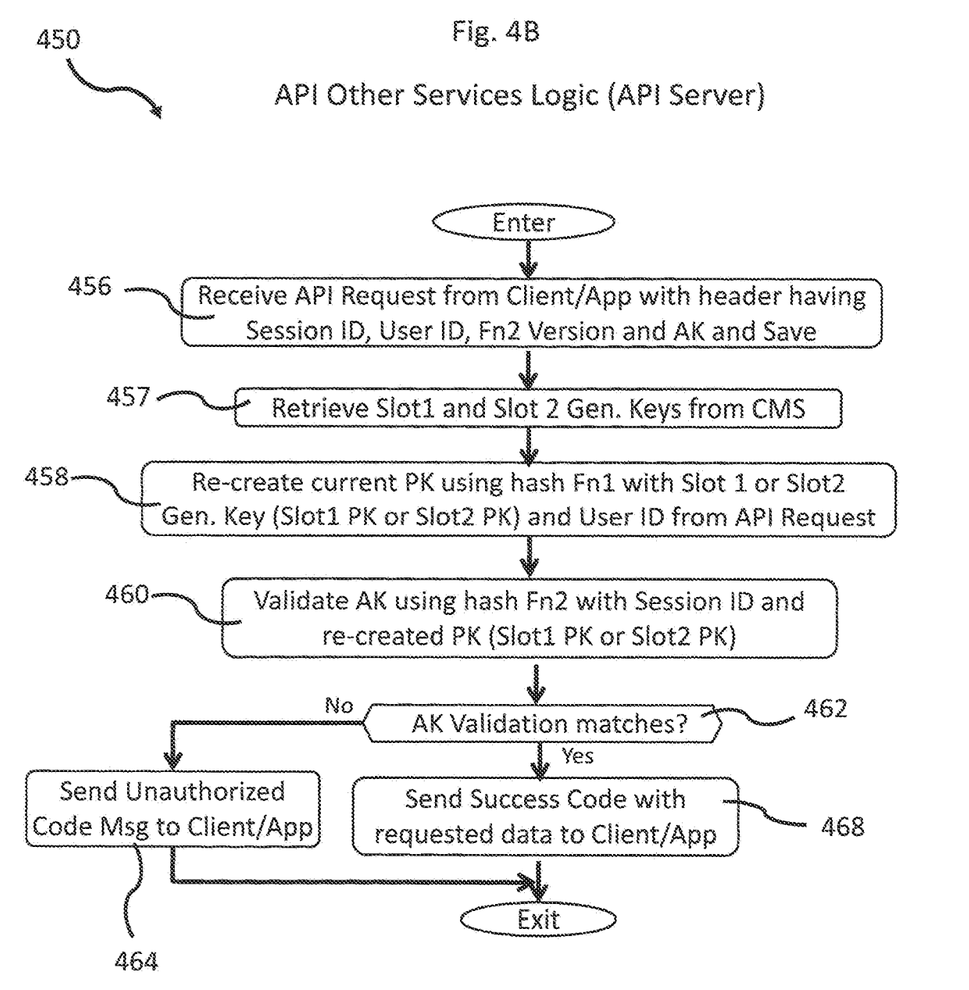
FIG. 4B is a flow diagram showing an API "Other Services" portion of an API Server-side public API authentication, in accordance with embodiments of the present disclosure.

Referring to FIG. 4B, a flow diagram 450 illustrates one embodiment of a process or logic for implementing the API "Other Services" Logic 222 (FIG. 2) portion of the Server API Authentication (CAA) Logic 80 (FIGS. 1 and 2). The process begins at block 456 when one of the "Other Services" (e.g., Articles Services, Video Services, Audio/Podcast, Sports Scores, or the like) receives an API Request having the User ID, Session ID, Function2 Version (Fn2 Vers.), and Authorization Key (AK), all in the http header (as discussed herein). An API Server copy of the Fn2 Version Table 500 (FIG. 5) having the versions of Fn2 may be stored in memory (or a server) accessible by the CAA logic. In some embodiments, the Fn2 Version Table 500 (FIG. 5) may be accessible by both the API Server and the Client/App. In some embodiments, separate copies of the Fn2 Version Table 500 (FIG. 5) may be accessible separately by the API Server and by the Client/App(s), respectively.

Next, block 457 retrieves Slot1 Generated Random Key and Slot2 Generated Random Key from the CMS 250. Next, block 458 re-creates (or re-calculates) the Partial Key (PK) using the Function Fn1 with the User ID from the API Request header and Slot1 Generated Random Key (Slot1 PK) or Slot2 Generated Random Key (Slot2 PK), both obtained from the CMS.

As discussed herein with FIG. 2, the current PK is re-created by the API Other Services to save time and memory space, instead of being stored after PK creation by Config. Service and later retrieved for use by API Other Services. In some embodiments, as discussed herein, instead of re-creating the PK by the API Other Services, the current PK associated with each Client/App may be stored upon creation by the API Config. Service and retrieved by the API Other Services when needed to validate the received AK.

Next, block 460 attempts to validate the received Authorization Key (AK) using the version of the hash Function2 (Fn2) provided in the API Request to re-create the Authorization Key (e.g., a "confirming" AK) independent from the Client/App source of the AK, and compare it to the received Authorization Key (AK) from the Client/App in the API Request to verify they match. The hash function Fn2 is performed with the Session ID and the re-created PK (Slot1 PK or Slot2 PK). As discussed herein with FIG. 2, the CMS saves the last two Slot Gen Keys, to allow two versions of the Slot Generated Random Key (Slot1 and Slot2) to be valid at any given time to avoid a condition where the Slot value changed between creating the PK (by the Config. Service) and processing the API Request (by the Other Services, e.g., GET Service 224), and thus avoiding an unnecessary AK validation failure. This also allows for asynchronous or "stateless" operation of both the Client/App 16 and the API Server 40A, as discussed herein.

The logic at block 460 may first try to validate the received AK using the re-created PK using Slot1 Generated Random Key (Slot1 PK), and if it does not validate, then try to validate using the re-created PK using Slot2 Generated Random Key (Slot2 PK). The AK validation attempts may be done in the opposite order, if desired (i.e., attempt to validate using the Slot1 first, then attempt the Slot2), or may calculate both conditions each time and then check if either matches the received AK.

Next, block 462 determines whether the received Authorization Key (AK) was valid, i.e., whether the confirming AK matches the received AK, using Slot1 PK or Slot2 PK, based on the results of the AK validation attempt in block 460. If No, block 464 sends an unauthorized code or failure message (e.g., Unauthorized Code 401) to the Client/App that sent the API Request and the logic exits. If the result of block 462 is Yes, block 468 sends an API Response message which includes a "success" message (e.g., Success Code 401, or other the success message/code) and sends it to the Client/App 20 together with any associated requested data, as discussed herein, from the associated API "Other Services" requested, e.g., Article data, Video data, Audio/

Podcast data, Game Scores data, or the like. The above API "Other Services" logic 450 may be executed as part of any of the API "Other Services", such as the GET Service 224, the PUT Service 226, the POST Service 228, the DELETE Service 230, for a REST API. Other types of APIs and associated API other services may be used if desired.

The Client/App hash function Fn2 used by the Client/App to generate the Temporary Key (TK) and the Authentication Key (AK) may have many different versions as described herein, e.g., at least 2, 3, 4, 5, 10, 20, 50, or 100 versions or more. Also, the Client/App hash function Fn2 used to create the Temporary Key (TK), may be referred to herein as the TK hash function (Fn2) or TK Fn2. Similarly, the Client/App hash function Fn2 used to create the Authentication Key (AK), may be referred to herein as the AK hash function (Fn2) or AK Fn2. Also, as discussed herein, the Fn2 hash function or Fn2 version may be selected randomly by the Client/App or by any other selection technique, such that the TK Fn2 version and the AK Fn2 version are different, and the current and prior versions for each of the TK Fn2 and the AK Fn2 are also different. Also, the first or API Server hash function (Fn1) used by the API Server (Config. Service) to generate the Partial Key (PK) may be a fixed single hash function (not varying), and may also be referred to herein as the PK hash function (Fn1) or PK Fn1. In some embodiments, the PK Fn1 may have different versions or be a varying hash function that changes or varies over time, similar to what is done for the Client/App varying hash function Fn2 (or Client/App Fn2). In that case, the PK Fn1 version may be saved by the Config. Service so it can be used (or retrieved) by the API Other Services when needed.

The system, computers, servers, devices, logic and the like described herein have the necessary electronics, computer processing power, interfaces, memory, hardware, software, firmware, logic/state machines, databases, microprocessors, communication links (wired or wireless), displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general-purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, mobile communication devices, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, functions, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for providing public API authentication by an API server, comprising:
   receiving from a client a Partial Key (PK) request for a Partial Key(PK), the PK request having a User ID, a Session ID, a TK hash function (Fn2) version, and a received Temporary Key (TK), the TK hash function (Fn2) version defining a TK hash function (Fn2) used to create the TK;
   validating the received TK using the TK Fn2 hash function with the Session ID and one of an Initial Key (IK) and a current Partial Key (PK);
   when the validating the received TK is completed successfully, sending to the client the Partial Key (PK), the PK being calculated using a PK hash function (Fn1) with the User ID and a slot generated random key (Slot Gen Key), the Fn1 hash function being different from the TK Fn2 hash function;
   receiving from the client an API request for an API service, the API request having the User ID, the Session ID, AK Fn2 version, and a received Authorization Key (AK), the AK Fn2 version defining the AK Fn2 hash function used to create the AK, the AK Fn2 hash function being different from the TK Fn2 hash function;
   validating the received AK using the AK Fn2 hash function with the Session ID and the Partial Key (PK); and
   when the validating the received AK is completed successfully, sending to the client a successful response from the API service requested by the client.

2. The method of claim 1, further comprising after receiving from the client an API request for an API service, re-creating the PK using the PK hash function (Fn1) with the User ID and the slot generated random key (Slot Gen Key), as a re-created PK, and wherein the validating the received AK using the AK Fn2 hash function uses the re-created PK as the PK.

3. The method of claim 2, wherein the Slot Gen Key comprises a current slot generated random key (Slot1) and a previous slot generated random key (Slot2), and the re-creating the PK comprises creating a Slot1-based re-created PK (Slot1 PK) and a Slot2-based re-created PK (Slot2 PK), and the validating the received AK uses the Slot1 PK and the Slot2 PK.

4. The method of claim 1 wherein the validating the received TK comprises calculating a "confirming" Temporary Key (TK) using the TK Fn2 hash function with the Session ID and one of the Initial Key (IK) and the current Partial Key (PK), and validating the received TK matches the confirming TK.

5. The method of claim 1 wherein the validating the received AK comprises calculating a "confirming" Authorization Key (AK) using the AK Fn2 hash function with the Session ID and the Partial Key (PK), and validating the received AK matches the confirming AK.

6. The method of claim 1, wherein the validating the received TK using the TK Fn2 hash function comprises using the Initial Key (IK) when a reset condition has occurred in the client.

7. The method of claim 1, wherein the validating the TK comprises first validating using the current PK and, if validation matching does not occur, then validating using the Initial Key (IK).

8. The method of claim 1, wherein the slot generated random key (Slot Gen Key) comprises two slot generated random keys.

9. The method of claim 1, wherein the slot generated random key (Slot Gen Key) is updated at a predetermined periodic Slot update rate.

10. The method of claim 9, wherein the Slot update rate is about 30 minutes.

11. The method of claim 1, wherein the TK hash function Fn2 version and the AK hash function version changes each time the Fn2 hash function is used, to be different from the prior version.

12. The method of claim 11, wherein the number of different TK hash function Fn2 versions and the number of different AK hash function versions is at least 3.

13. The method of claim 1, wherein the Client/App hash function Fn2 version changes randomly each time the Fn2 is used.

14. The method of claim 1, wherein the sending a successful response from the API service comprises providing data or content associated with the API request.

15. A method for providing public API authentication by a client, comprising:
   creating a random Session ID and a random User ID;
   obtaining a TK hash function (Fn2) version defining a TK hash function (Fn2);
   creating a Temporary Key (TK) using the TK Fn2 hash function with the Session ID and one of an Initial Key (IK) and a current Partial Key (PK);
   sending to an API server a PK request for a partial key, the PK request having the User ID, the Session ID, the TK Fn2 version, and the Temporary Key (TK), the TK Fn2 version defining the TK Fn2 hash function used to create the TK;
   receiving from the API server a new current Partial Key (PK);
   obtaining an AK hash function (Fn2) version defining an AK Fn2 hash function, the AK Fn2 hash function being different from the TK Fn2 hash function;
   creating an Authentication Key (AK) using the AK Fn2 hash function with the Session ID and the new current Partial Key (PK);
   sending to the API server an API request for an API service, the API request having the User ID, the Session ID, the AK Fn2 version, and the Authentication Key (AK), the AK Fn2 version defining the AK Fn2 hash function used to create the AK; and
   receiving from the API server a successful response for the requested API service.

16. The method of claim 15, further comprising determining when a reset condition has occurred.

17. The method of claim 15, further comprising determining when a reset condition has occurred, wherein the reset condition occurs when at least one of the following events occurs: a new session has started, and a predetermined period of inactivity has occurred, and a predetermined period of continuous activity has occurred.

18. The method of claim 15, wherein the creating a Temporary Key (TK) comprises using the Initial Key (IK) when a reset condition has occurred.

19. The method of claim 15, further comprising creating the TK with the current PK and sending the PK request at a predetermined PK polling time period, wherein the PK polling time period is less than a PK update rate of the API Server.

20. The method of claim 15, wherein the receiving a successful response for the requested API service comprises receiving data or content associated with the API request.

21. The method of claim 15, wherein the TK hash function Fn2 version and the AK hash function Fn2 version changes each time the Fn2 hash function is used, to be different from the prior version.

22. The method of claim 15, wherein the number of different TK hash function Fn2 versions and the number of different AK hash function Fn2 versions is at least 3.

23. The method of claim 1, wherein the TK hash function Fn2 version and the AK hash function Fn2 version changes randomly each time the Fn2 hash function is used.

24. A method for providing public API authentication by an API server, comprising:
   receiving from a client a Partial Key (PK) request for a Partial Key (PK), the PK request having a User ID, a Session ID, a TK hash function (Fn2) version, and a received Temporary Key (TK), the TK Fn2 version defining a TK hash function (Fn2) used to create the TK;
   validating the received TK using the TK Fn2 hash function with the Session ID and one of an Initial Key (IK) and a current Partial Key (PK);
   when the validating the received TK is completed successfully, sending to the client the Partial Key (PK), the PK being calculated using a PK hash function (Fn1) with the User ID and a slot generated random key (Slot Gen Key);
   receiving from the client an API request for an API service, the API request having the User ID, the Session ID, an AK Fn2 version, and a received Authorization Key (AK), the AK Fn2 version defining the AK hash function (Fn2) used to create the AK;
   re-creating the PK using the PK hash function (Fn1) with the User ID and the slot generated random key (Slot Gen Key), as a re-created PK;

validating the received AK using the AK Fn2 hash function with the Session ID and the re-created PK; and when the validating the received AK is completed successfully, sending to the client a successful response from the API service requested by the client.

25. The method of claim 24, wherein the Slot Gen Key comprises a current slot generated random key (Slot1) and a previous slot generated random key (Slot2), and the re-creating the PK comprises creating a Slot1-based re-created PK (Slot1 PK) and a Slot2-based re-created PK (Slot2 PK), and the validating the received AK uses the Slot1 PK and the Slot2 PK.

* * * * *